United States Patent [19]
Smith

[11] Patent Number: 5,803,470
[45] Date of Patent: Sep. 8, 1998

[54] STROLLER TRANSPORTING DEVICE

[76] Inventor: Jayne E. Smith, 1385 Red Bank Dr., Grove City, Ohio 43123

[21] Appl. No.: 640,480

[22] Filed: May 1, 1996

[51] Int. Cl.$^6$ ...................................................... B62B 1/00
[52] U.S. Cl. ........................... 280/37; 280/655; 190/18 A; 190/110
[58] Field of Search .......................... 280/37, 655, 655.1, 280/47.26, 47.315; 190/18 A, 115, 108, 110

[56] References Cited

U.S. PATENT DOCUMENTS

| | | | |
|---|---|---|---|
| 1,521,260 | 12/1924 | Trachtenberg | 190/108 |
| 2,187,445 | 1/1940 | Botelho | 190/108 |
| 2,699,235 | 1/1955 | Chestnut | 190/110 X |
| 4,550,813 | 11/1985 | Browning | 280/37 X |
| 5,062,557 | 11/1991 | Mahvi et al. | 190/110 X |
| 5,291,976 | 3/1994 | Ku | 280/47.26 X |
| 5,547,052 | 8/1996 | Latshaw | 190/18 A X |

FOREIGN PATENT DOCUMENTS

WO9112744  9/1991  WIPO ...................................... 280/37

*Primary Examiner*—Robert J. Oberleitner
*Assistant Examiner*—Pamela J. Lipka

[57] ABSTRACT

The present invention relates to a device for use in storing and transporting a child's stroller. In its broadest context, the present invention includes a rear cover, with an associated stroller wheel receiving recess, hingedly secured to a front cover, with an associated stroller wheel receiving recess. The storing and transporting device of the present invention also employs a number of detachable pouches which are securable within the interior of the device. Wheels and a retractable handle are both provided for use in transporting the entire assembly.

1 Claim, 3 Drawing Sheets

STROLLER TRANSPORTING DEVICE

BACKGROUND OF THE INVENTION

1. Field of the Invention

The present invention relates to stroller transporting device and more particularly pertains to a device for transporting a stroller.

2. Description of the Prior Art

The use of strollers is known in the prior art. More specifically, strollers heretofore devised and utilized for the purpose of transporting children are known to consist basically of familiar, expected, and obvious structural configurations, notwithstanding the myriad of designs encompassed by the crowded prior art which has been developed for the fulfillment of countless objectives and requirements.

U.S. Pat. Nos. 5,201,535 to Kato et al; 3,984,115 to Miller; Des 261,129 to Perego; 5,133,567 to Owens; 4,844,504 to Bigo; and 4,478,427 to Hyde et al. all disclose stroller constructions.

In this respect, the stroller transporting device according to the present invention substantially departs from the conventional concepts and designs of the prior art, and in doing so provides an apparatus primarily developed for the purpose of transporting a stroller.

Therefore, it can be appreciated that there exists a continuing need for new and improved stroller transporting device which can be used for transporting strollers. In this regard, the present invention substantially fulfills this need.

SUMMARY OF THE INVENTION

In view of the foregoing disadvantages inherent in the known types of strollers now present in the prior art, the present invention provides an improved stroller transporting device. As such, the general purpose of the present invention, which will be described subsequently in greater detail, is to provide a new and improved stroller transporting device and method which has all the advantages of the prior art and none of the disadvantages.

To attain this, the present invention essentially comprises a device for use in storing and transporting a child's stroller. The device includes a rear cover having an upper extent, a lower extent and an intermediate extent therebetween, and an outer surface an inner surface and a peripheral edged therebetween. The inner and outer surfaces being rounded outwardly approximate the lower extent. A pair of recessed wheels are rotatably secured to the lower extent of the rear cover, and a pair of pivotal latches are secured to the upper extent of the cover. The front cover includes an upper extent, a lower extent and an intermediate extent therebetween, and an outer surface and an inner surface and a peripheral edge therebetween. The lower extent of the front cover is hingedly attached to the lower extent of the rear cover. The inner and outer surfaces are rounded outwardly approximate the lower extent. A pair of stops are secured to the lower extent, and a pair of latch receptors secured to the upper extent of the cover. A first closable container having a front side and a rear side is included within the device. The rear side is detachably secured to the inner surface of the front cover approximate the upper extent. A second closable container having a front side and a rear side is also included within the device. The rear side is detachably secured to the inner surface of the front cover below the first closable container. A handle assembly is positioned upon the device. The assembly includes a housing component and a pull arm. The housing component is secured to the outer surface of the rear cover, and the pull arm is slidably received within the housing component and has a first orientation wherein the pull arm is extended from the housing component and a second orientation wherein the pull arm is positioned within the housing component. A strap is included for carrying the device. The strap includes a proximal end pivotally secured to the peripheral edge of the rear cover approximate the upper extent. The strap further includes a distal end, a first anchor positioned upon the peripheral edge of the rear cover approximate the lower extent, and a second anchor positioned upon the peripheral edge of the rear cover approximate the upper extent and opposite the first anchor. The distal end of the strap is adapted for releasable engagement with either of the two anchors.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved stroller transporting device which have all the advantages of the prior art strollers and none of the disadvantages.

It is another object of the present invention to provide new and improved stroller transporting device which may be easily and efficiently manufactured and marketed.

It is further object of the present invention to provide new and improved stroller transporting device which are of durable and reliable constructions.

An even further object of the present invention is to provide new and improved stroller transporting device which are susceptible of a low cost of manufacture with regard to both materials and labor, and which accordingly are then susceptible of low prices of sale to the consuming public, thereby making such stroller transporting device economically available to the buying public.

Still yet another object of the present invention is to provide new and improved stroller transporting device which provide in the apparatuses and methods of the prior art some of the advantages thereof, while simultaneously overcoming some of the disadvantages normally associated therewith.

Even still another object of the present invention is to enable the easy transport of a child's stroller.

Lastly, it is an object of the present invention to provide a new and improved device for use in storing and transporting a child's stroller. In its broadest context, the present invention includes a rear cover, with an associated stroller wheel receiving recess, hingedly secured to a front cover, with an associated stroller wheel receiving recess. The storing and transporting device of the present invention also employs a number of detachable pouches which are securable within the interior of the device. Wheels and a retractable handle are both provided for use in transporting the entire assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
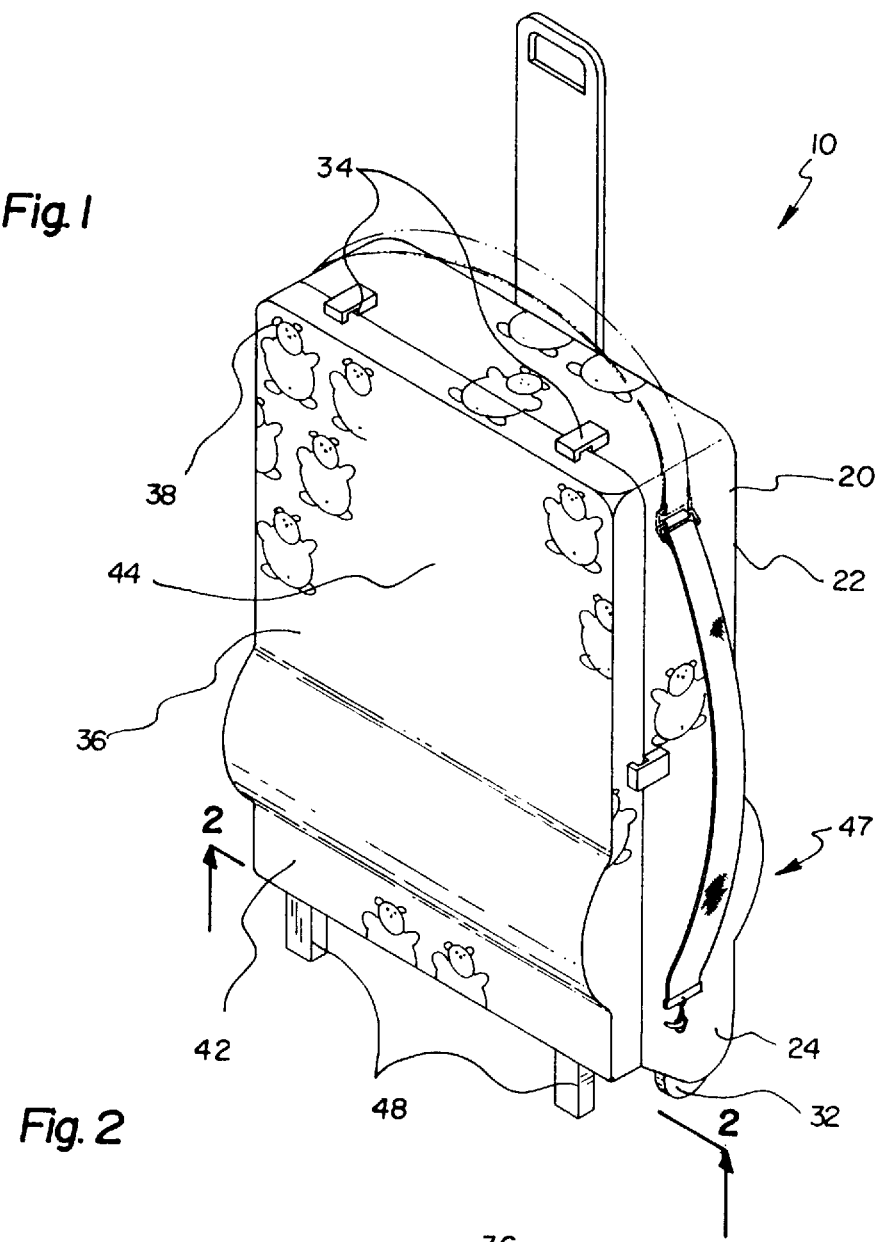
FIG. 1 is a perspective view of the preferred embodiment of the stroller transporting device constructed in accordance with the principles of the present invention.

With reference now to the drawings, and in particular to FIG. 1 thereof, the preferred embodiment of the new and improved stroller transporting device embodying the principles and concepts of the present invention and generally designated by the reference numeral 10 will be described.

The present invention relates to a device for use in storing and transporting a child's stroller. In its broadest context, the present invention includes a rear cover, with an associated stroller wheel receiving recess, hingedly secured to a front cover, with an associated stroller wheel receiving recess. The storing and transporting device of the present invention also employs a number of detachable pouches which are securable within the interior of the device. Wheels and a retractable handle are both provided for use in transporting the entire assembly. The various components of the present invention, and the manner in which they interrelate, will be described in greater detail hereinafter.

Figure 2:
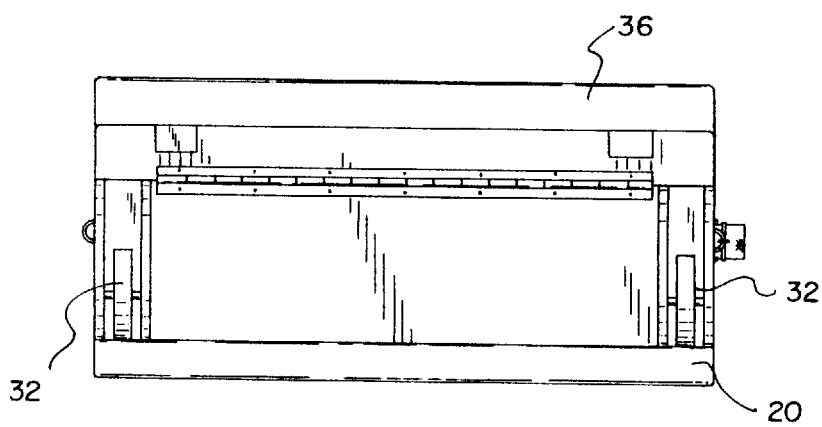
FIG. 2 is a view taken along line 2—2 of FIG. 1.
Figure 3:
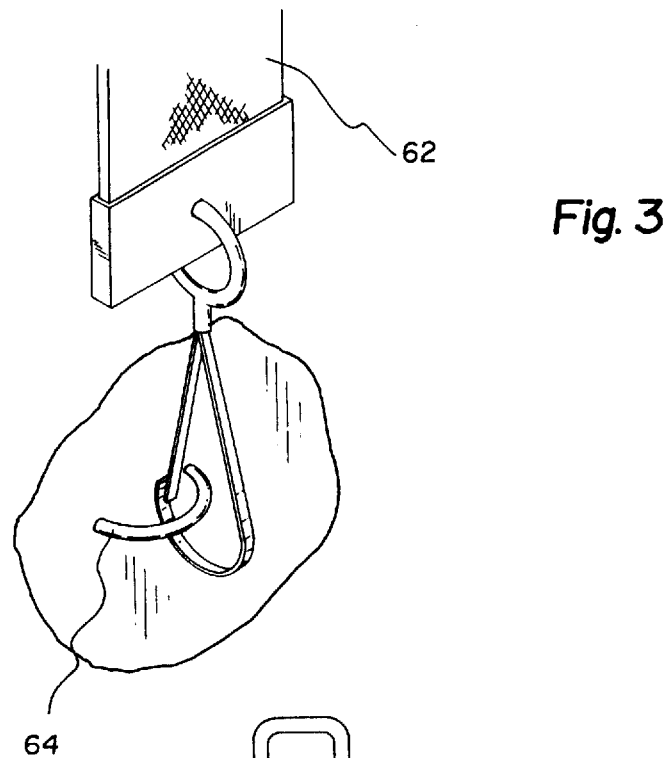
FIG. 3 is a view of the distal end of the strap.
Figure 4:
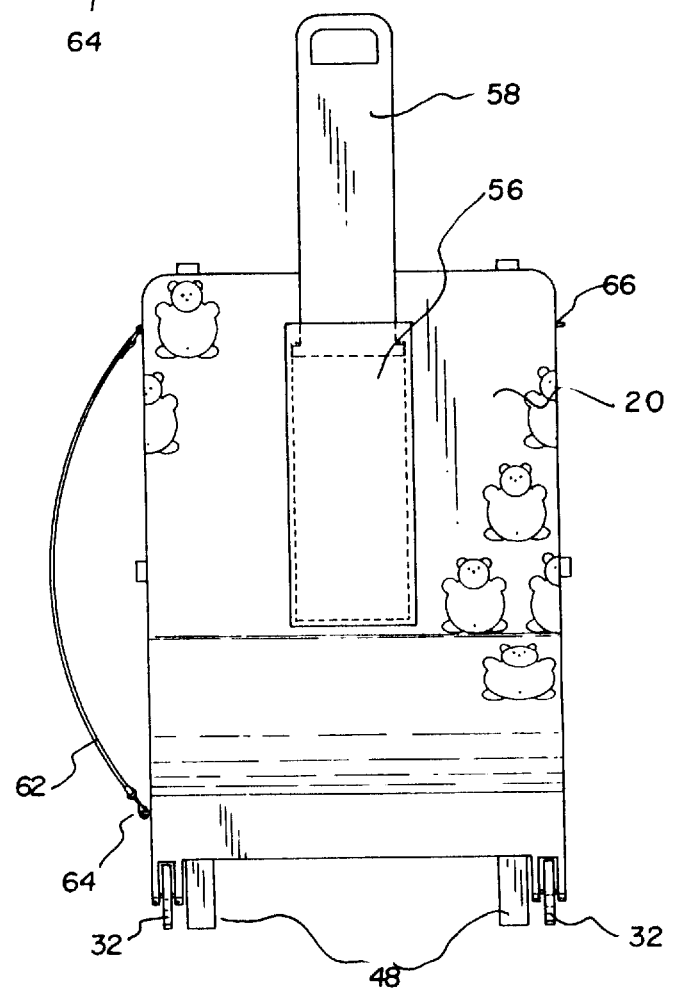
FIG. 4 is a rear view of the device in accordance with the present invention.
Figure 5:
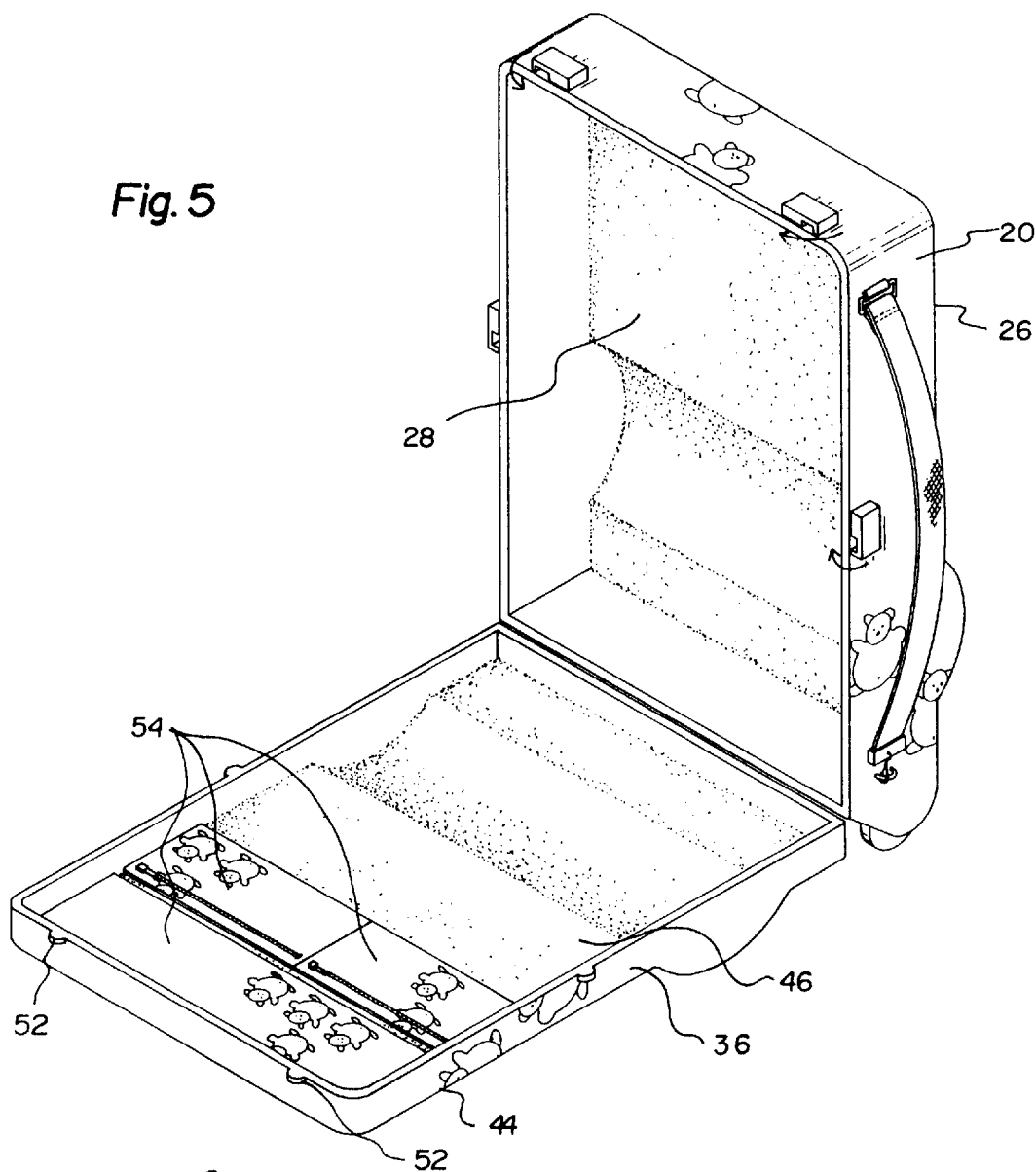
FIG. 5 is a view of the device in an opened configuration.
Figure 6:
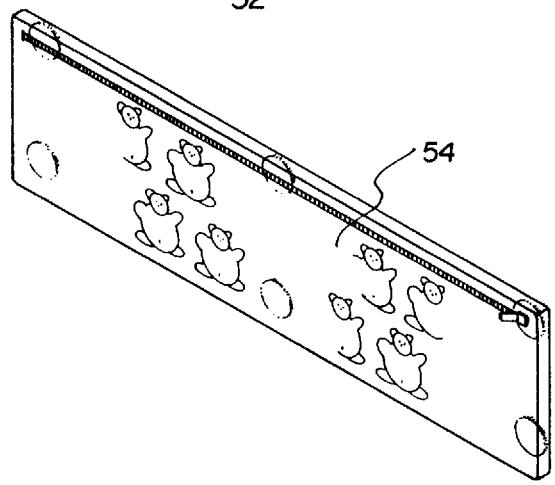
FIG. 6 is a view of one of the closable containers.

The rear cover 20 is defined by an upper extent 22, a lower extent 24 and an intermediate extent therebetween. This cover is further defined by an outer surface 26 an inner surface 28 and a peripheral edge which extends therebetween. The inner and outer surfaces are rounded outwardly approximate the lower extent of the cover. The rounding of the surfaces creates a recess which is adapted to receive the wheels of a stroller when it is stored within the device of the present invention. In order to provide a degree of protection to the contents of the transporting device, a layer of foam padding is secured to the inner surface of the cover. A pair of recessed wheels 32 are rotatably secured to the lower extent 24 of the rear cover 20 to aid in the transport of the entire device 10. As can be seen in FIG. 2, the wheels 32 have their upper extends positioned within the lower extent 24 of the rear cover 20. A pair of pivotal latches 34 are secured to the upper extent 22 of the cover 20 and are adapted to cooperate with a pair of latch receptors positioned upon the front cover. The exact operation of the latches will be described in greater detail hereinafter.

Like the rear cover 20, the front cover 36 is defined by an upper extent 38, a lower extent 42 and an intermediate extent therebetween. The front cover is further defined by an outer surface 44 and an inner surface 46 and a peripheral edge therebetween. The lower extent 42 of the front cover 36 is hingedly attached to the lower extent 24 of the rear cover 20. The hinge which interconnects the two covers can most readily be seen with reference to FIG. 2. The inner and outer surfaces are rounded outwardly approximate the lower extent. This rounding of the two surfaces creates a recess. This recess is dimensioned and positioned to cooperate with the recess of the rear cover to thus define a stroller wheel receiving space 47. As with the rear cover 20, the inner surface 46 of the front cover 36 has a layer of foam padding secured thereto for the purpose of protection. A pair of stops 48 are secured to the lower extent 42 of the front cover 36. These stops 48 ensure that when the transporting device is in an upright orientation, as depicted in FIG. 1, it can not be transported by way of the wheels 32. As indicated previously, a pair of latch receptors 52 are secured to the upper extent 38 of the front cover 36. These receptors 52 are adapted to be removably coupled with the pivotal latches 34 positioned upon the upper extent 22 of the rear cover 20. Thus, with the front and rear covers pivoted into a facing relationship the latches, and associated latch receptors, can be employed to lock the covers together.

A number of containers 54 can be utilized within the interior of the transporting device 10 for the purpose of storing infant supplies. Any number of these containers 54 can be employed in conjunction with the present invention. In the preferred embodiment, there are three such containers: a first closable container; a second closable container; and a third closable container. Each of these containers includes a front side and a rear side, with the rear side being detachably secured to the inner surface of the front cover. Thus, the first container would be detachably secured to the inner surface approximate the upper extent, the second container would be detachably secured below the first container, and the third would be detachably secured below the second container. In the preferred embodiment, each of these containers is secured to the interior by way of hook and pile fasteners.

In order to make the entire transporting device easier to maneuver a handle assembly is employed. The handle assembly is defined by a housing component 56 and a pull arm 58. The housing component 56 is hollow and secured to the outer surface 26 of the rear cover 20. The pull arm 58 is slidably received within the housing component and has a first orientation wherein the pull arm 58 is extended from the housing component 56, and a second orientation wherein the pull arm 58 is positioned within the housing component 56. Thus, a user wishing to transport the device 10 of the present invention could extent the handle to the first orientation and then pull the device by way of the wheels 32. Then, when the user wishes to store or carry the device, the handle can be slid to the second orientation within the housing component.

A strap 62 is included for use in carrying the device of the present invention. This strap 62 is defined by a proximal end, pivotally secured to the peripheral edge of the rear cover approximate the upper extent, and a distal end. A first anchor 64 is positioned upon the peripheral edge of the rear cover 20 approximate the lower extent 24. Likewise, a second anchor 66 is positioned upon the peripheral edge of the rear cover 20 approximate the upper extent 22 and opposite the first anchor 64. The distal end of the strap 62 is adapted for releasable engagement with either of these two anchors. The distal end of the strap 62 and the two anchors create two use orientations for the strap: a first orientation wherein the distal end is secured to the first anchor 64; and a second orientation wherein the distal end is secured to the second anchor 66.

Impact resistant plastic can be utilized to construct the two covers of the device. Furthermore, in order to make the device appealing to children, a decorative covering can be supplied upon the outer surfaces of each of the covers.

In use, a children's stroller is first folded into its collapsed orientation. In such an orientation, the front and rear wheels are brought into proximity to each other. Next, the stroller is placed within the transporting device of the present invention. The stroller is placed into the device such that the wheels are received within the recesses of the covers. The front cover is then brought into facing relation with the rear cover and the latches pivoted into engagement with latch receptors. Then the pull arm can be extended into the first orientation and the entire assembly moved by way of the wheels.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A device for use in storing and transporting a child's stroller, the device comprising in combination:

a rear cover having an upper extent, a lower extent and an intermediate extent therebetween, an outer surface, an inner surface and a peripheral edge therebetween, the inner and outer surfaces being rounded outwardly approximate the lower extent, a pair of recessed wheels rotatably secured to the lower extent of the rear cover, a pair of pivotal latches secured to the upper extent;

a front cover having an upper extent, a lower extent and an intermediate extent therebetween, an outer surface and an inner surface and a peripheral edge therebetween, the lower extent of the front cover being hingedly attached to the lower extent of the rear cover, the inner and outer surfaces of the front cover being rounded at the lower extent of the front cover, a pair of stops secured to the lower extent of the front cover, a pair of latch receptors secured to the upper extent of the front cover wherein the front and rear covers at their intermediate extents have a protrusion for accommodating wheels of a stroller to be stored inside the device;

a first closable container having a front side and a rear side, the rear side being detachably secured to the inner surface of the front cover approximate the upper extent of the front cover;

a second closable container having a front side and a rear side, the rear side being detachably secured to the inner surface of the front cover below the first closable container;

a handle assembly having a housing component and a pull arm, the housing component being secured to the outer surface of the rear cover, the pull arm being slidably received within the housing component and having a first orientation wherein the pull arm is extended from the housing component and a second orientation wherein the pull arm is positioned within the housing component;

a strap having a proximal end pivotally secured to the peripheral edge of the rear cover approximate the upper extent, the strap further including a distal end, a first anchor positioned upon the peripheral edge of the rear cover approximate the lower extent of the rear cover, a second anchor positioned upon the peripheral edge of the rear cover approximate the upper extent of the rear cover and opposite the first anchor, the distal end of the strap adapted for releasable engagement with either of the two anchors.

* * * * *